US012731719B2

(12) United States Patent
Shimoyasu et al.

(10) Patent No.: US 12,731,719 B2
(45) Date of Patent: Sep. 8, 2026

(54) ELECTRONIC COMPONENT

(71) Applicant: TDK CORPORATION, Tokyo (JP)

(72) Inventors: Masashi Shimoyasu, Tokyo (JP); Yoji Tozawa, Tokyo (JP); Akihiko Oide, Tokyo (JP); Daiki Kato, Tokyo (JP); Midori Kishimoto, Tokyo (JP); Satoshi Takasu, Tokyo (JP); Yo Saito, Yurihonjo-city (JP); Rui Takahashi, Yurihonjo-city (JP); Kenta Sasaki, Yurihonjo-city (JP); Makoto Yoshino, Tokyo (JP); Kazuhiro Ebina, Tokyo (JP)

(73) Assignee: TDK CORPORATION, Tokyo (JP)

( * ) Notice: Subject to any disclaimer, the term of this patent is extended or adjusted under 35 U.S.C. 154(b) by 764 days.

(21) Appl. No.: 18/188,534

(22) Filed: Mar. 23, 2023

(65) Prior Publication Data

US 2023/0317351 A1 Oct. 5, 2023

(30) Foreign Application Priority Data

Mar. 29, 2022 (JP) ................................ 2022-053176

(51) Int. Cl.
*H01F 27/28* (2006.01)
*H01F 27/29* (2006.01)

(52) U.S. Cl.
CPC ....... *H01F 27/2804* (2013.01); *H01F 27/292* (2013.01); *H01F 2027/2809* (2013.01)

(58) Field of Classification Search
CPC ......... H01F 27/2804; H01F 2027/2809; H01F 17/0006; H01F 17/0013; H01F 5/003; H01F 2017/0066; H01F 27/29; H01F 27/292
USPC .................................................. 336/200, 232
See application file for complete search history.

(56) References Cited

U.S. PATENT DOCUMENTS

2010/0123994 A1* 5/2010 Nishisaka .............. H01G 4/232 361/306.3
2013/0069752 A1 3/2013 Kim et al.
2018/0137964 A1* 5/2018 Tozawa ............... H01F 17/0013
2018/0366248 A1* 12/2018 Maruyama ............. H05K 1/181
2019/0348214 A1* 11/2019 Tobita ..................... H01F 27/29
2020/0251273 A1 8/2020 Takai et al.
(Continued)

FOREIGN PATENT DOCUMENTS

JP 2013-089640 A 5/2013
JP 2019-004080 A 1/2019
JP 2020-126914 A 8/2020
(Continued)

*Primary Examiner* — Tszfung J Chan
(74) *Attorney, Agent, or Firm* — Oliff PLC

(57) ABSTRACT

An electronic component has an element body; and an external electrode having a main body portion covering at least the second surface and a first wrapping-around portion wrapping around the third surface in the element body. The wrapping-around portion of the external electrode has a first part having a first distance, a second part having a second distance, a third part having a third distance, a fourth part having a fourth distance, and a fifth part having a fifth distance in the second direction in order from one side to the other side in the first direction. The second distance is longer than the first distance and the third distance. The fourth distance is longer than the third distance and the fifth distance.

5 Claims, 10 Drawing Sheets

(56) References Cited

U.S. PATENT DOCUMENTS

2021/0327623 A1 10/2021 Maruyama et al.
2022/0139610 A1 * 5/2022 Kazuta .................. H01F 27/292
174/260

FOREIGN PATENT DOCUMENTS

KR 10-2010-0054726 A 5/2010
KR 10-2013-0031581 A 3/2013
KR 10-2018-0055700 A 5/2018

* cited by examiner

ELECTRONIC COMPONENT

CROSS REFERENCE TO RELATED APPLICATIONS

This application claims priority to Japanese Patent Application No. 2022-053176 filed on Mar. 29, 2022, the entire contents of which are incorporated by reference herein.

TECHNICAL FIELD

The present disclosure relates to an electronic component.

BACKGROUND

An electronic component including an element body and an external electrode formed by baking a metal paste on a surface of the element body is known (for example, Japanese Unexamined Patent Publication No. 2020-126914). In Patent Document 1, an external electrode has a main body portion covering a predetermined surface of an element body and a wrapping-around portion wrapping around a surface orthogonal to the predetermined surface.

SUMMARY

In an electronic component having the constitution described above, cracking may occur in an element body due to stress acting on the element body. When cracking occurs in an element body, there is a problem that reliability of an electronic component is impaired.

An object of an aspect of the present disclosure is to provide an electronic component in which stress is relaxed and occurrence of cracking in an element body can be curbed.

An electronic component according to the aspect of the present disclosure includes an element body having a pair of first surfaces facing each other in a first direction, a pair of second surfaces facing each other in a second direction orthogonal to the first direction, and a pair of third surfaces facing each other in a third direction orthogonal to the first direction and the second direction; and an external electrode having a main body portion covering at least the second surface and a first wrapping-around portion wrapping around the third surface in the element body. The wrapping-around portion of the external electrode has a first part having a first distance, a second part having a second distance, a third part having a third distance, a fourth part having a fourth distance, and a fifth part having a fifth distance in the second direction in order from one side to the other side in the first direction. The second distance is longer than the first distance and the third distance. The fourth distance is longer than the third distance and the fifth distance.

This electronic component includes the external electrode having the main body portion covering at least the second surface and the first wrapping-around portion wrapping around the third surface in the element body. In the wrapping-around portion of this external electrode, the second distance is longer than the first distance and the third distance, and the fourth distance is longer than the third distance and the fifth distance. In this case, the first wrapping-around portion has an uneven shape protruding in the second direction in the second part and the fourth part. In this case, it is easy for the first wrapping-around portion to disperse stress acting on the element body. Thus, stress can be relaxed and occurrence of cracking in the element body can be curbed.

The second part and the fourth part may be disposed with a center position of the element body in the first direction interposed therebetween. In this case, the second part and the fourth part having a large protruding amount can be disposed in a manner of being dispersed in the first direction. Accordingly, a uniform stress dispersion performance of the element body in the first direction can be achieved.

Thicknesses of the second part and the fourth part in the third direction may be larger than thicknesses of the first part, the third part, and the fifth part. In this case, stress can be more easily dispersed by securing the thicknesses of the second part and the fourth part.

The second part and the fourth part may be disposed at positions closer to the first surfaces than the center position of the element body in the first direction. In this case, since an uneven shape can be provided near a corner portion between the first surface and the third surface which is a portion where stress is likely to be concentrated, stress in the portion is easily dispersed.

The electronic component may further include a coil provided inside the element body. A coil portion of the coil may not overlap the second part and the fourth part when viewed in the third direction. In this case, it is possible to curb occurrence of a stray capacitance caused when the first wrapping-around portion and the coil overlap each other. For this reason, it is possible to have countermeasure against noise in a wide band by extending a self-resonant frequency to a higher frequency.

The external electrode may have the pair of first wrapping-around portions wrapping around the pair of third surfaces, and a pair of second wrapping-around portions wrapping around the pair of first surfaces. In the pair of first wrapping-around portions, the second distance may be longer than the first distance and the third distance, and the fourth distance may be longer than the third distance and the fifth distance. In this case, it is possible to have a structure in which stress is easily dispersed on both sides of the pair of first wrapping-around portions.

According to the present disclosure, it is possible to provide an electronic component in which stress is relaxed and occurrence of cracking in an element body can be curbed.

DETAILED DESCRIPTION

Hereinafter, with reference to the accompanying drawings, an embodiment of the present disclosure will be described in detail. In description of the drawings, the same reference signs are used for elements which are the same or equivalent, and duplicate description thereof will be omitted.

Figure 1:
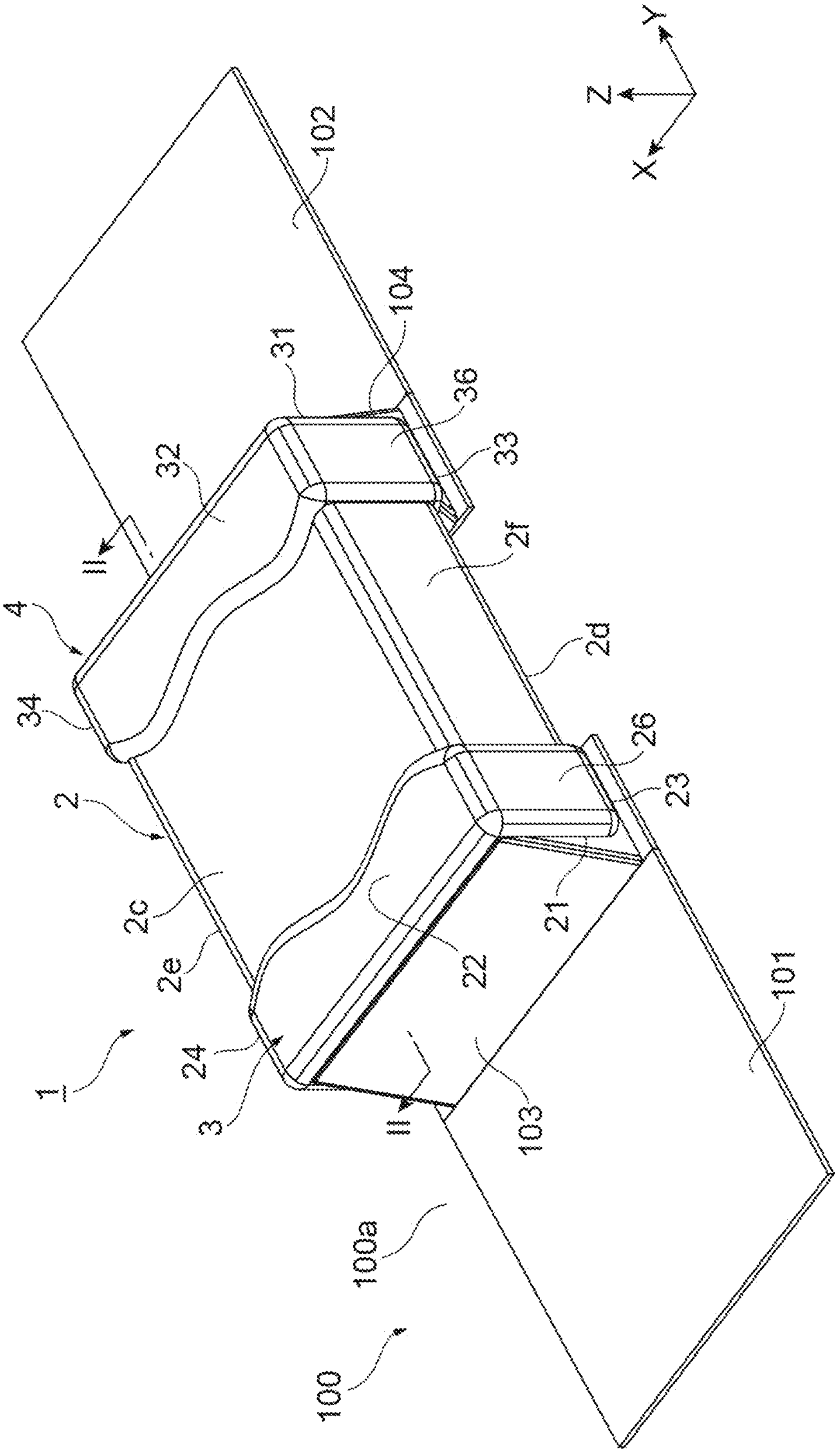
FIG. 1 is a perspective view of an electronic component according to the present embodiment.
Figure 2:
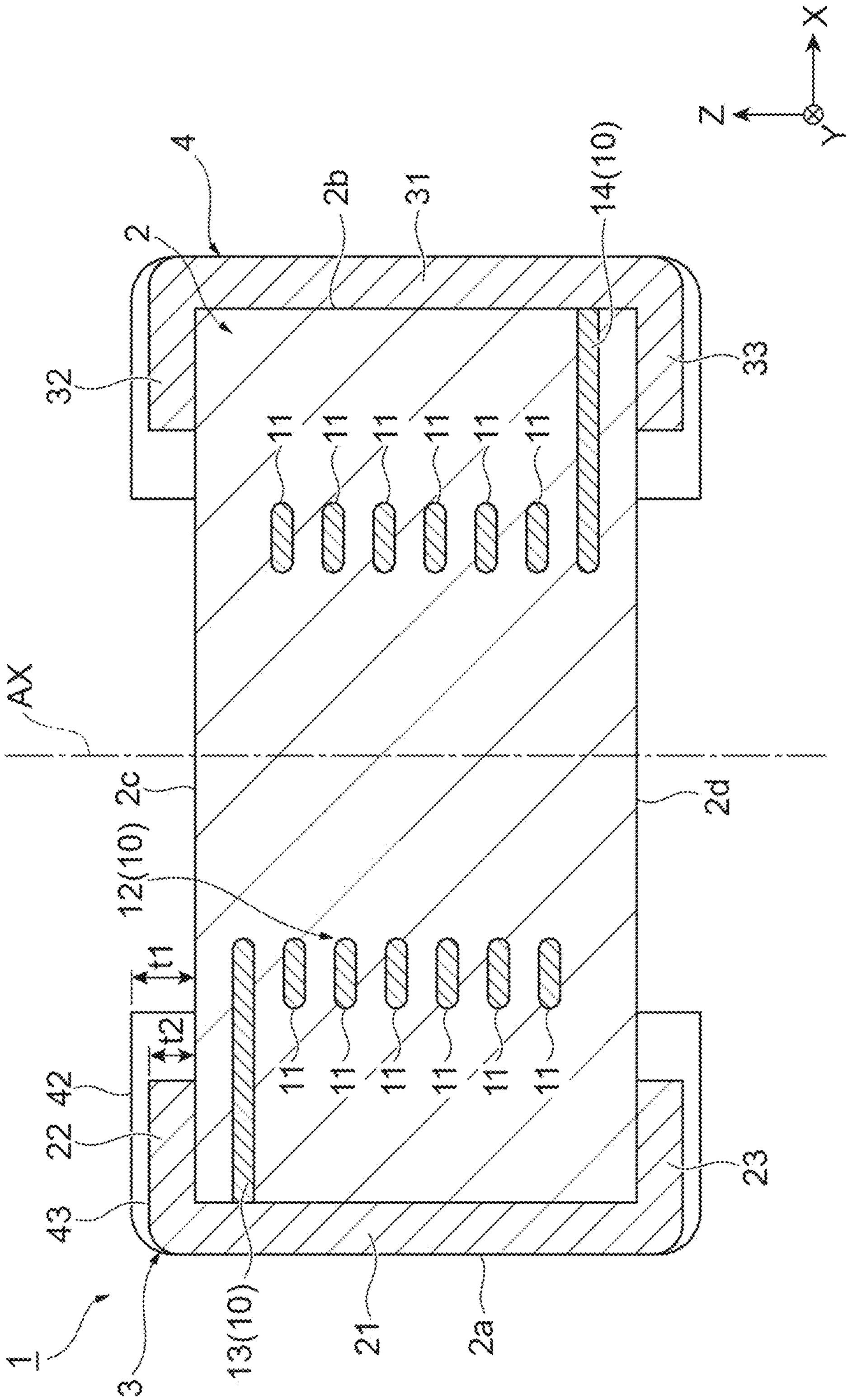
FIG. 2 is a cross-sectional view along line II-II indicated in FIG. 1.
Figure 3A:
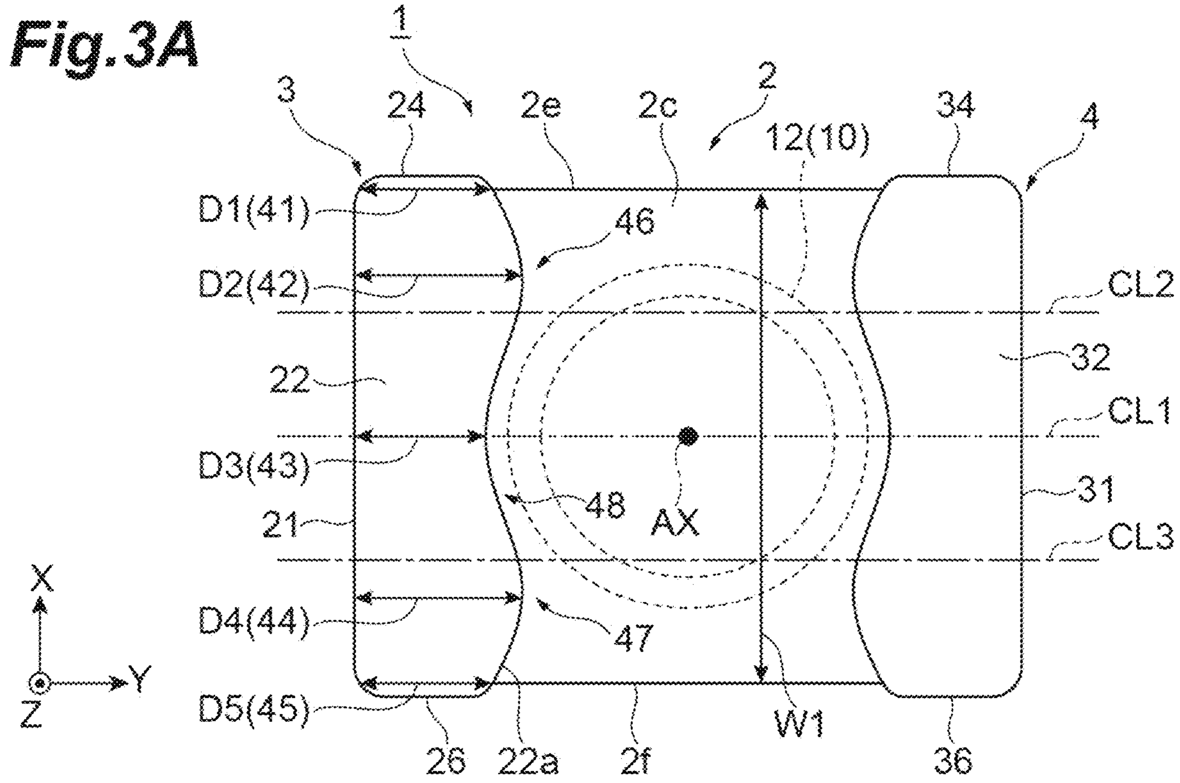
FIGS. 3A and 3B are views of the electronic component viewed in a Z axis direction.
Figure 3B:
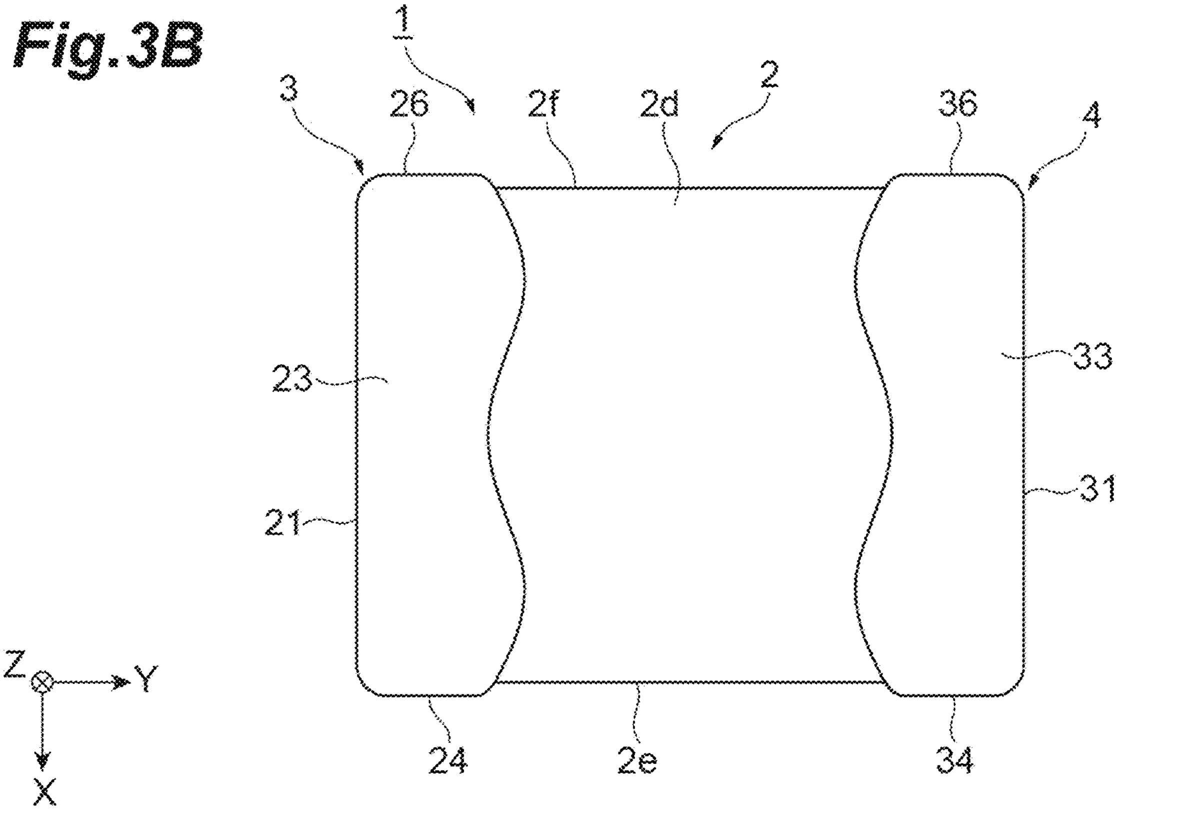

First, with reference to FIGS. 1 to 3B, a schematic constitution of an electronic component 1 according to the present embodiment will be described. FIG. 1 is a perspective view of the electronic component 1 according to the present embodiment. FIG. 2 is a cross-sectional view along line II-II in FIG. 1. FIG. 3A is a plan view of the electronic component 1 viewed from a positive side in a Z axis direction. FIG. 3B is a bottom view of the electronic component 1 viewed from a negative side in the Z axis direction. An X axis direction, a Y axis direction, and the Z axis direction are directions intersecting each other. The electronic component according to the present embodiment is formed by stacking a plurality of layers in the Z axis direction. Interlayer boundaries are integrated to the extent that they cannot be visually recognized. In the present embodiment, the X axis direction, the Y axis direction, and the Z axis direction are orthogonal to each other. Although it is not particularly limited, in the present embodiment, the X axis direction corresponds to "a first direction" in the claims, the Y axis direction corresponds to "a second direction" in the claims, and the Z axis direction corresponds to "a third direction" in the claims.

As illustrated in FIG. 1, the electronic component 1 includes an element body 2 and external electrodes 3 and 4. For example, the electronic component 1 is solder-mounted electronic equipment. For example, electronic equipment includes a circuit board or an electronic component. In the present embodiment, the element body 2 is formed using a plurality of element body layers stacked in the Z axis direction.

For example, the element body 2 has insulation properties. For example, the element body 2 is constituted using a magnetic material. For example, a magnetic material includes at least one selected from a Ni—Cu—Zn-based ferrite material, a Ni—Cu—Zn—Mg-based ferrite material, and a Ni—Cu-based ferrite material. A magnetic material constituting the element body 2 may include a Fe alloy or the like. The element body 2 may be constituted using a non-magnetic material. For example, a non-magnetic material includes at least one selected from a glass ceramic material and a dielectric material.

For example, the element body 2 exhibits a rectangular parallelepiped shape. A rectangular parallelepiped shape includes a rectangular parallelepiped shape in which corner portions and ridgeline portions are chamfered and a rectangular parallelepiped shape in which corner portions and ridgeline portions are rounded. The shape of the element body 2 is not limited to a rectangular parallelepiped shape. For example, the element body 2 may exhibit a columnar shape.

The element body 2 has a pair of end surfaces 2*a* and 2*b* (refer to FIG. 2), a pair of side surfaces 2*c* and 2*d*, and a pair of side surfaces 2*e* and 2*f* (refer to FIG. 1), as outer surfaces thereof. For example, the area of each of the side surfaces 2*c* and 2*d* is larger than the area of any of the end surface 2*a*, the end surface 2*b*, the side surface 2*e*, and the side surface 2*f*. For example, each of the pair of end surfaces 2*a* and 2*b*, the pair of side surfaces 2*c* and 2*d*, and the pair of side surfaces 2*e* and 2*f* is a flat surface.

The pair of end surfaces 2*a* and 2*b* face each other in the Y axis direction. The pair of side surfaces 2*c* and 2*d* face each other in the Z axis direction. The pair of side surfaces 2*e* and 2*f* face each other in the X axis direction. For example, in the element body 2, the lengths in the Z axis direction and the X axis direction are shorter than the length in the Y axis direction. For example, in the element body 2, the length in the Z axis direction is shorter than the lengths in the X axis direction and the Y axis direction. The length ratios of the element body 2 in the X axis direction, the Y axis direction, and the Z axis direction are not limited thereto. For example, the Y axis direction is a longitudinal direction. In the present embodiment, the X axis direction corresponds to "the first direction" in the claims, the Y axis direction corresponds to "the second direction" in the claims, and the Z axis direction corresponds to "the third direction" in the claims. In the present embodiment, the side surfaces 2*e* and 2*f* correspond to "first surfaces" in the claims, the end surfaces 2*a* and 2*b* correspond to "second surfaces" in the claims, and the side surfaces 2*c* and 2*d* correspond to "third surfaces" in the claims.

A pair of external electrodes 3 and 4 are disposed apart from each other on an outer surface of the element body 2. The pair of external electrodes 3 and 4 face each other in the Y axis direction. The pair of external electrodes 3 and 4 are separated from each other in the Y axis direction.

For example, the pair of external electrodes 3 and 4 are formed by the technique described below. For example, the pair of external electrodes 3 and 4 are constituted using a metal material. For example, a metal material is copper, silver, gold, nickel, or chromium. For example, the pair of external electrodes 3 and 4 are formed by performing plating on an electrode layer. For example, an electrode layer is constituted of a conductive paste. For example, a conductive paste is applied by a dipping method, a printing method, or a transferring method. For example, plating is electroplating or electroless plating. By this plating, a plating layer is formed on an outer surface of a conductive paste.

As illustrated in FIGS. 2, 3A and 3B, for example, the external electrode 3 includes a main body portion 21, a pair of wrapping-around portions 22 and 23 (first wrapping-around portions) and a pair of wrapping-around portions 24 and 26 (second wrapping-around portions, refer to FIG. 1). The main body portion 21 of the external electrode 3 is provided in a manner of covering the end surface 2*a*. The wrapping-around portions 22 and 23 of the external electrode 3 are provided in a manner of wrapping around the pair of side surfaces 2*c* and 2*d*. The wrapping-around portions 24 and 26 of the external electrode 3 are provided in a manner of wrapping around the pair of side surfaces 2*e* and 2*f*. For example, the main body portion 21 of the external electrode 3 covers the entire surface of the end surface 2*a*. For example, the wrapping-around portions 22, 23, 24, and 26 of the external electrode 3 cover parts of the pair of side surfaces 2*c* and 2*d* and the pair of side surfaces 2*e* and 2*f*. The main body portion 21 of the external electrode 3 is coupled to the wrapping-around portions 22, 23, 24, and 26 of the external electrode 3. In each of the side surfaces 2*c* and 2*d*, regions covered by the wrapping-around portions 22 and 23 of the external electrode 3 have an uneven shape (details will be described below). In each of the side surfaces 2*e* and 2*f*, regions covered by the wrapping-around portions 24 and 26 of the external electrode 3 exhibit a rectangular shape, for example.

For example, the external electrode 4 includes a main body portion 31, a pair of wrapping-around portions 32 and 33, and a pair of wrapping-around portions 34 and 36 (refer to FIG. 1). The main body portion 31 of the external electrode 4 is provided in a manner of covering the end surface 2*b*. The wrapping-around portions 32 and 33 of the external electrode 4 are provided in a manner of wrapping around the pair of side surfaces 2*c* and 2*d*. The wrapping-around portions 34 and 36 of the external electrode 4 are provided in a manner of wrapping around the pair of side surfaces 2*e* and 2*f*. For example, the main body portion 31 of the external electrode 4 covers the entire surface of the end surface 2*b*. For example, the wrapping-around portions 32, 33, 34, and 36 of the external electrode 4 cover parts of the pair of side surfaces 2*c* and 2*d* and the pair of side surfaces 2*e* and 2*f*. The main body portion 31 of the external electrode 4 is coupled to the wrapping-around portions 32, 33, 34, and 36 of the external electrode 4. In each of the side surfaces 2*c* and 2*d*, regions covered by the wrapping-around portions 32 and 33 of the external electrode 4 have an uneven shape (details will be described below). In each of the side surfaces 2*e* and 2*f*, regions covered by the wrapping-around portions 34 and 36 of the external electrode 4 exhibit a rectangular shape, for example.

As illustrated in FIGS. 2, 3A and 3B, the electronic component 1 further includes a coil 10 disposed inside the element body 2. The coil has a coil axis AX extending in the Z axis direction. That is, the Z 10 axis direction corresponds to a coil axis direction. When the electronic component 1 is mounted on electrode pads 101 and 102 of a substrate 100, the coil axis AX of the coil 10 becomes parallel to an upper surface 100*a* of the substrate 100. The external electrodes 3 and 4 of the coil 10 are connected to the electrode pads 101 and 102 with solder 103 and solder 104 therebetween.

As illustrated in FIG. 2, the coil 10 includes a coil portion 12 which is constituted to have a spiral shape by connecting coil conductors 11 formed in respective layers, a projecting portion 13 which projects from the coil portion 12 to the external electrode 3, and a projecting portion 14 which projects from the coil portion 12 to the external electrode 4. For example, the coil conductors 11 are constituted using a metal material. For example, a metal material is copper, silver, gold, nickel, or chromium. In the example illustrated in FIG. 3A, the coil portion 12 of the coil 10 has an annular shape when viewed in the Z axis direction. The coil portion 12 is constituted by connecting arc-shaped conductor patterns formed in respective layers in a stacking direction in a spiral shape.

Next, with reference to FIG. 3A, a constitution of the wrapping-around portion 22 of the external electrode 3 on the positive side in the Z axis direction will be described. As illustrated in FIG. 3B, since the wrapping-around portion 23 of the external electrode 3 on the negative side in the Z axis direction has a constitution with the same purpose as the wrapping-around portion 22, description thereof will be omitted. As illustrated in FIG. 3A, since the wrapping-around portion 32 of the external electrode 4 has a bilaterally symmetrical constitution with the wrapping-around portion 22, description thereof will be omitted. As illustrated in FIG. 3B, since the wrapping-around portion 33 of the external electrode 4 has a bilaterally symmetrical constitution with the wrapping-around portion 23, description thereof will be omitted. That is, positional relationships of parts 41, 42, 43, 44, and 45 in the wrapping-around portion 22 are also established in the remaining wrapping-around portions 23, 32, and 33.

The wrapping-around portion 22 of the external electrode 3 has a first part 41 having a first distance D1, a second part 42 having a second distance D2, a third part 43 having a third distance D3, a fourth part 44 having a fourth distance D4, and a fifth part 45 having a fifth distance D5 in the Y axis direction in order from the positive side toward the negative side in the X axis direction. In this case, the second distance D2 is longer than the first distance D1 and the third distance D3. In addition, the fourth distance D4 is longer than the third distance D3 and the fifth distance D5. The lower limit value therefor is not particularly limited. However, the lengths of the distances D2 and D4 are preferably longer than 100% compared to the lengths of the remaining distances D1, D3, and D5 and more preferably equal to or longer than 105%. The upper limit value therefor is not particularly limited. However, the lengths of the distances D2 and D4 are preferably equal to or shorter than 150% compared to the lengths of the remaining distances D1, D3, and D5 and more preferably equal to or shorter than 130%.

In the present embodiment, the wrapping-around portion 22 has protruding portions 46 and 47 of an edge portion 22*a* on the positive side in the Y axis direction protruding to the positive side in the Y axis direction. The protruding portions 46 and 47 have a curved shape projecting to the positive side in the Y axis direction. The protruding portion 46 and the protruding portion 47 disposed in a manner of being apart from each other in the X axis direction. In addition, a recessed portion 48 of the edge portion 22*a* formed to be recessed to the negative side in the Y axis direction is formed between the protruding portion 46 and the protruding portion 47. Here, the recessed portion 48 has a curved shape projecting to the negative side in the Y axis direction.

In such a constitution, a part corresponding to the side surface 2*e* on the positive side in the X axis direction corresponds to the first part 41. A part corresponding to the largest portion positioned on the farthest positive side in the Y axis direction in the protruding portion 46 corresponds to the second part 42. A part corresponding to the smallest portion positioned on the farthest negative side in the Y axis direction in the recessed portion 48 corresponds to the third part 43. A part corresponding to the largest portion positioned on the farthest positive side in the Y axis direction in the protruding portion 47 corresponds to the fourth part 44. A part corresponding to the side surface 2*f* on the negative side in the X axis direction corresponds to the fifth part 45.

The second part 42 and the fourth part 44 are disposed with a center position of the element body 2 in the X axis direction interposed therebetween. That is, the protruding portion 46 and the second part 42 are disposed on the positive side in the X axis direction from a centerline CL1 in the X axis direction. The protruding portion 47 and the fourth part 44 are disposed on the negative side in the X axis direction from the centerline CL1.

The second part 42 is disposed at a position closer to the side surface 2*e* than the center position of the element body 2 in the X axis direction. When a centerline CL2 in the X axis direction between the centerline CL1 and the side surface 2*e* is set, the second part 42 is disposed on the positive side in the X axis direction from the centerline CL2. The fourth part 44 is disposed at a position closer to the side surface 2*f* than the center position of the element body 2 in the X axis direction. When a centerline CL3 in the X axis direction between the centerline CL1 and the side surface 2*f* is set, the fourth part 44 is disposed on the negative side in the X axis direction from the centerline CL3.

The position of the second part 42 in the X axis direction is not particularly limited. However, for example, when a width dimension W1 of the element body 2 is the X axis direction 100%, the second part 42 need only have a dimension within a range of 20% from the centerline CL2. The fourth part 44 need only have a dimension within a range of 20% from the centerline CL3.

The thicknesses of the second part 42 and the fourth part 44 in the Z axis direction are larger than the thicknesses of the first part 41, the third part 43, and the fifth part 45. Specifically, as illustrated in FIG. 2, a thickness t1 of the second part 42 is a dimension in the Z axis direction between the side surface 2*c* on the positive side in the Z axis direction and an upper surface of the second part 42. A thickness t2 of the third part 43 is a dimension in the Z axis direction between the side surface 2*c* on the positive side in the Z axis direction and an upper surface of the third part 43. For example, the thickness t2 is 15 to 35 μm. In contrast, the thickness t1 is 100% to 170% with respect to the thickness t2.

As illustrated in FIG. 3A, the coil portion 12 of the coil 10 does not overlap the second part 42 and the fourth part 44 when viewed in the Z axis direction. A region of the coil portion 12 on the negative side in the Y axis direction is disposed in a manner of entering the recessed portion 48 while maintaining a state of being disposed on the positive side in the Y axis direction from the protruding portions 46 and 47 and the recessed portion 48. The same applies to a region of the coil portion 12 on the positive side in the Y axis direction.

Figure 4B:
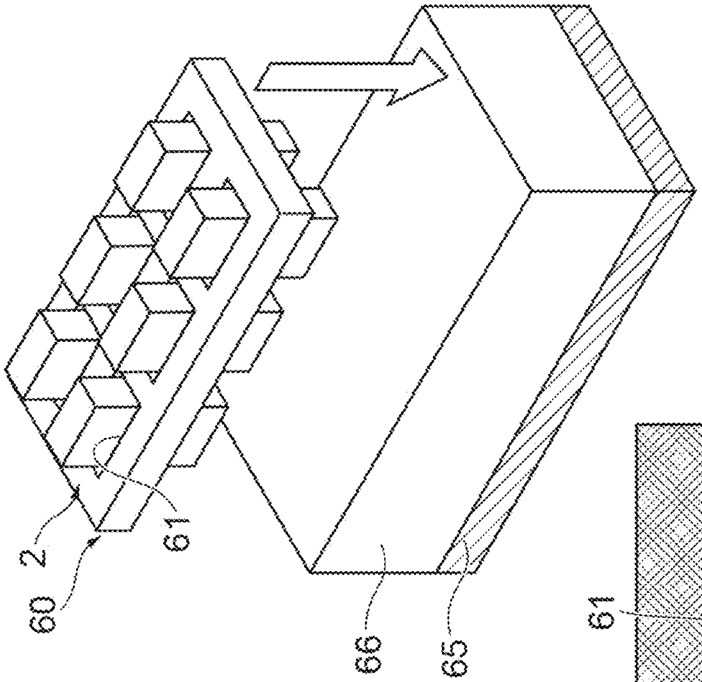
FIGS. 4A, 4B and 4C are views illustrating a method for forming an external electrode.
Figure 4A:
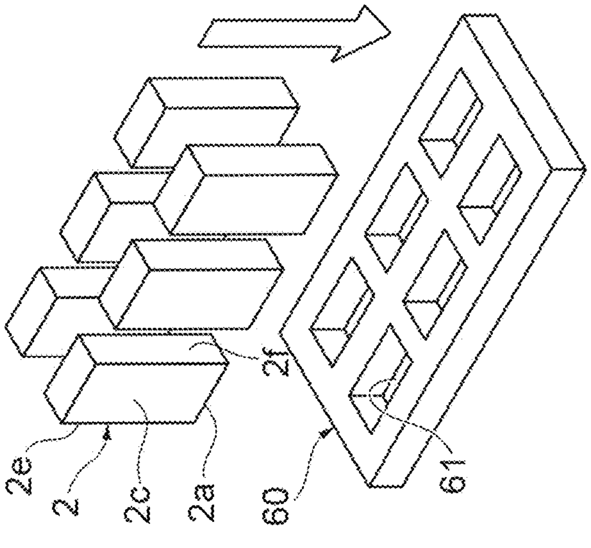
Figure 4C:
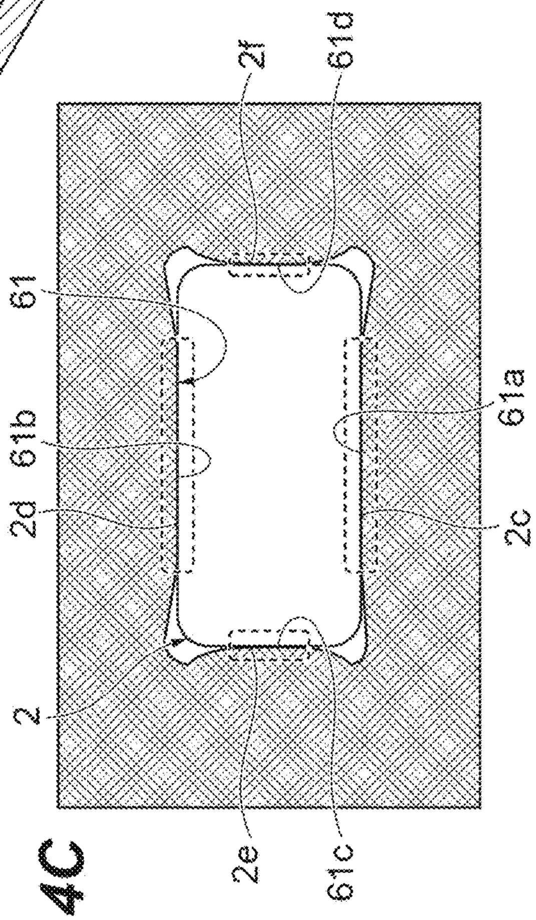

Next, with reference to FIGS. 4A, 4B, and 4C, an example of a method for forming the external electrode 3 described above in the element body 2 will be described. As illustrated in FIG. 4A, a plurality of element bodies 2 are inserted into a silicon alignment tool 60. When the external electrode 3 is formed on the end surface 2*a* side, the plurality of element bodies 2 are inserted into a holding hole 61 of the alignment tool 60 such that the end surface 2*a* becomes a lower side. As illustrated in FIG. 4C, the holding hole 61 has holding portions 61*a*, 61*b*, 61*c*, and 61*d* which chafe against the side surfaces 2*c*, 2*d*, 2*e*, and 2*f*. Siloxane is adhered to the chafed parts of each element body 2 such that they have hydrophobic properties. Parts of the element body 2 which come into tight contact with the holding hole 61 become portions where the protruding portions 46 and 47 are unlikely to be formed. A gap is provided between the element body 2 and portions other than the holding portions 61*a*, 61*b*, 61*c*, and 61*d* on an inner circumferential surface of the holding hole 61. As illustrated in FIG. 4B, in a state in which the plurality of element bodies 2 are held by the alignment tool 60, the element bodies 2 are dipped into an electrode paste 66 disposed on an electrode paste receptacle 65. At this time, the electrode paste 66 adheres to parts of the element bodies 2 exposed to the lower side of the alignment tool 60. Moreover, the electrode paste 66 enters the portions which are not in tight contact therewith in the portions held by the holding hole 61, thereby forming the protruding portions 46 and 47.

Next, operations and effects of the electronic component 1 according to the present embodiment will be described. Operations and effects will be described mainly regarding the wrapping-around portion 22 of the external electrode 3. However, similar operations and effects are also established in the remaining wrapping-around portions 23, 32, and 33.

This electronic component 1 includes the external electrode 3 having the main body portion 21 covering the end surface 2*a* and the wrapping-around portion 22 wrapping around the side surface 2*c* in the element body 2. In the wrapping-around portion 22 of this external electrode 3, the second distance D2 is longer than the first distance D1 and the third distance D3, and the fourth distance D4 is longer than the third distance D3 and the fifth distance D5. In this case, the wrapping-around portion 22 has an uneven shape protruding in the Y axis direction in the second part 42 and the fourth part 44. In this case, it is easy for the wrapping-around portion 22 to disperse stress acting on the element body 2. Thus, stress can be relaxed and occurrence of cracking in the element body 2 can be curbed.

The second part 42 and the fourth part 44 may be disposed with the center position of the element body 2 in the Y axis direction interposed therebetween. In this case, the second part 42 and the fourth part 44 having a large protruding amount can be disposed in a manner of being dispersed in the X axis direction. Accordingly, a uniform stress dispersion performance of the element body 2 in the X axis direction can be achieved.

The thicknesses of the second part 42 and the fourth part 44 in the Z axis direction may be larger than the thicknesses of the first part 41, the third part 43, and the fifth part 45. In this case, stress can be more easily dispersed by securing the thicknesses of the second part 42 and the fourth part 44.

The second part 42 and the fourth part 44 may be disposed at positions closer to the side surfaces 2*e* and 2*f* than the center position of the element body 2 in the X axis direction. In this case, since an uneven shape can be provided near a corner portion between the side surfaces 2*e* and 2*f* and the side surface 2*c* which is a portion where stress is likely to be concentrated, stress in the portion is easily dispersed.

The electronic component 1 may further include the coil 10 provided inside the element body 2. The coil portion 12 of the coil 10 may not overlap the second part 42 and the fourth part 44 when viewed in the Z axis direction. In this case, it is possible to curb occurrence of a stray capacitance caused when the wrapping-around portion 22 and the coil portion 12 of the coil 10 overlap each other. For this reason, it is possible to have countermeasure against noise in a wide band by extending a self-resonant frequency to a higher frequency.

Figure 5A:
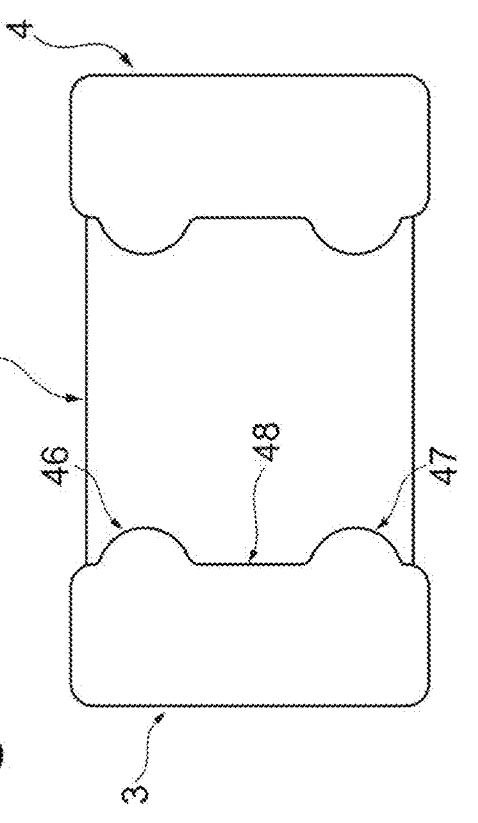
FIGS. 5A, 5B, 5C and 5D are views illustrating a positional relationship between the external electrode and a coil.
Figure 5B:
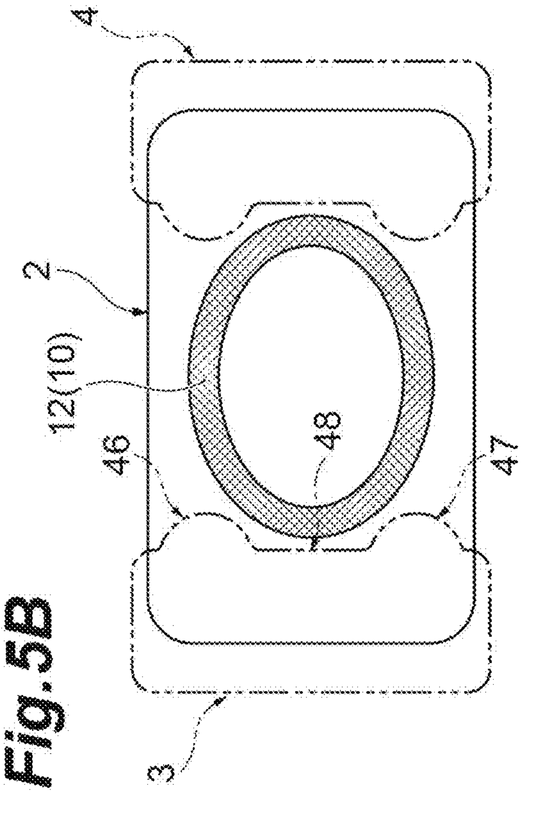
Figure 5C:
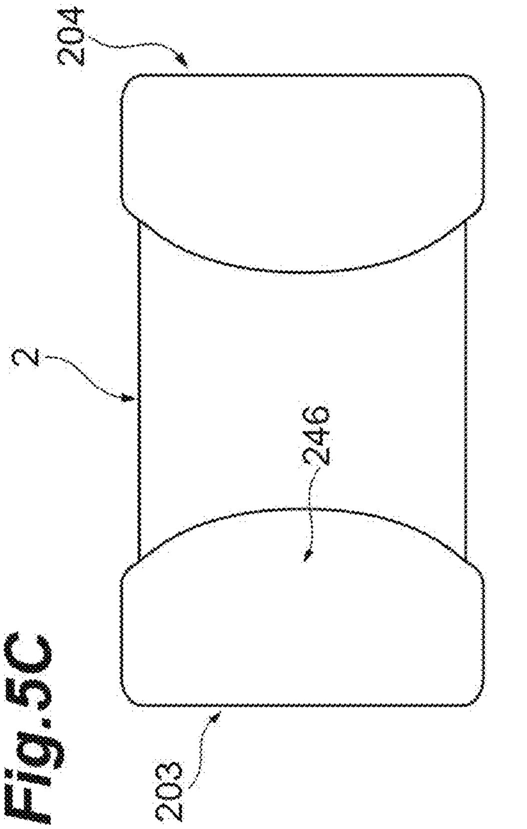
Figure 5D:
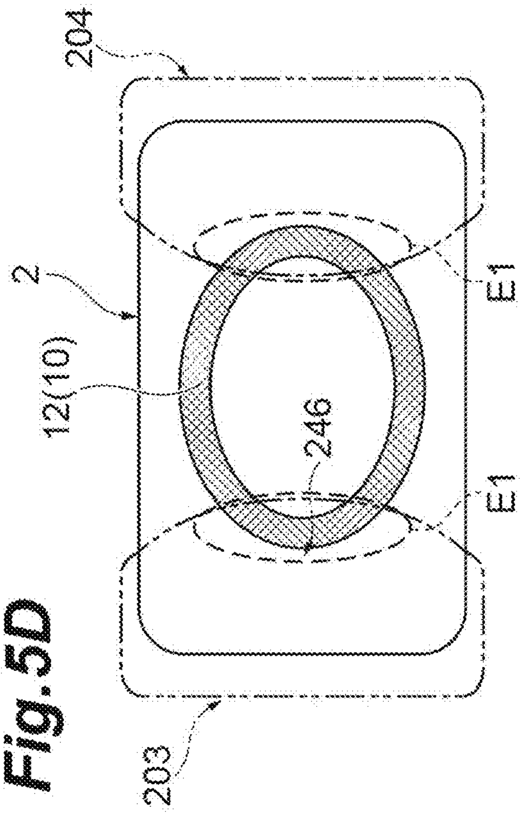

For example, in a comparative example illustrated in FIG. 5C, a protruding portion 246 is formed at the center position between external electrodes 203 and 204. In this case, as illustrated in FIG. 5D, areas near end portions of the coil portion 12 (regions E1) overlap a protruding portions 246 of the external electrodes 203 and 204. In this case, a stray capacitance is generated in the regions E1. In this case, a self-resonant frequency (SRF) shifts to a low frequency side so that a frequency range allowing countermeasure against noise is narrowed. In contrast, as illustrated in FIGS. 5A and 5B, the coil portion 12 of the coil 10 is disposed in the recessed portion 48 between the protruding portions 46 and 47 and does not overlap the external electrodes 3 and 4. For this reason, since a stray capacitance as in the comparative example is not generated, it is possible to have countermeasure against noise in a wide band by extending a self-resonant frequency to a higher frequency.

The external electrode 3 may have the pair of wrapping-around portions 22 and 23 wrapping around the pair of side surfaces 2*c* and 2*d* and the pair of wrapping-around portions 24 and 26 wrapping around the pair of side surfaces 2*e* and 2*f*. In the pair of wrapping-around portions 22 and 23, the second distance D2 may be longer than the first distance D1 and the third distance D3, and the fourth distance D4 may be longer than the third distance D3 and the fifth distance D5. In this case, it is possible to have a structure in which stress is easily dispersed on both sides of the pair of wrapping-around portions 22 and 23.

Figure 6:
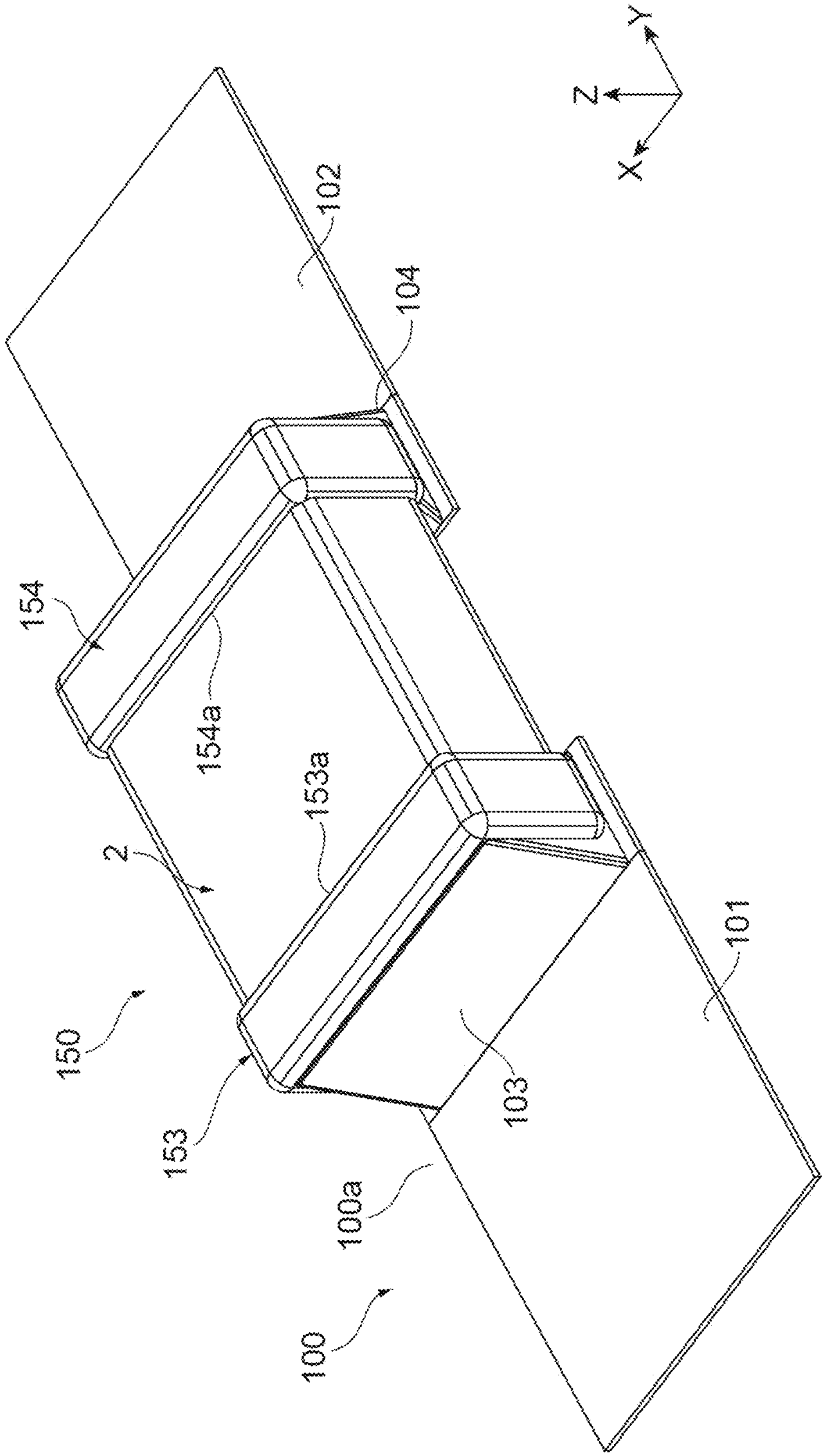
FIG. 6 is a perspective view of an electronic component according to Modification Example 1.
Figure 7:
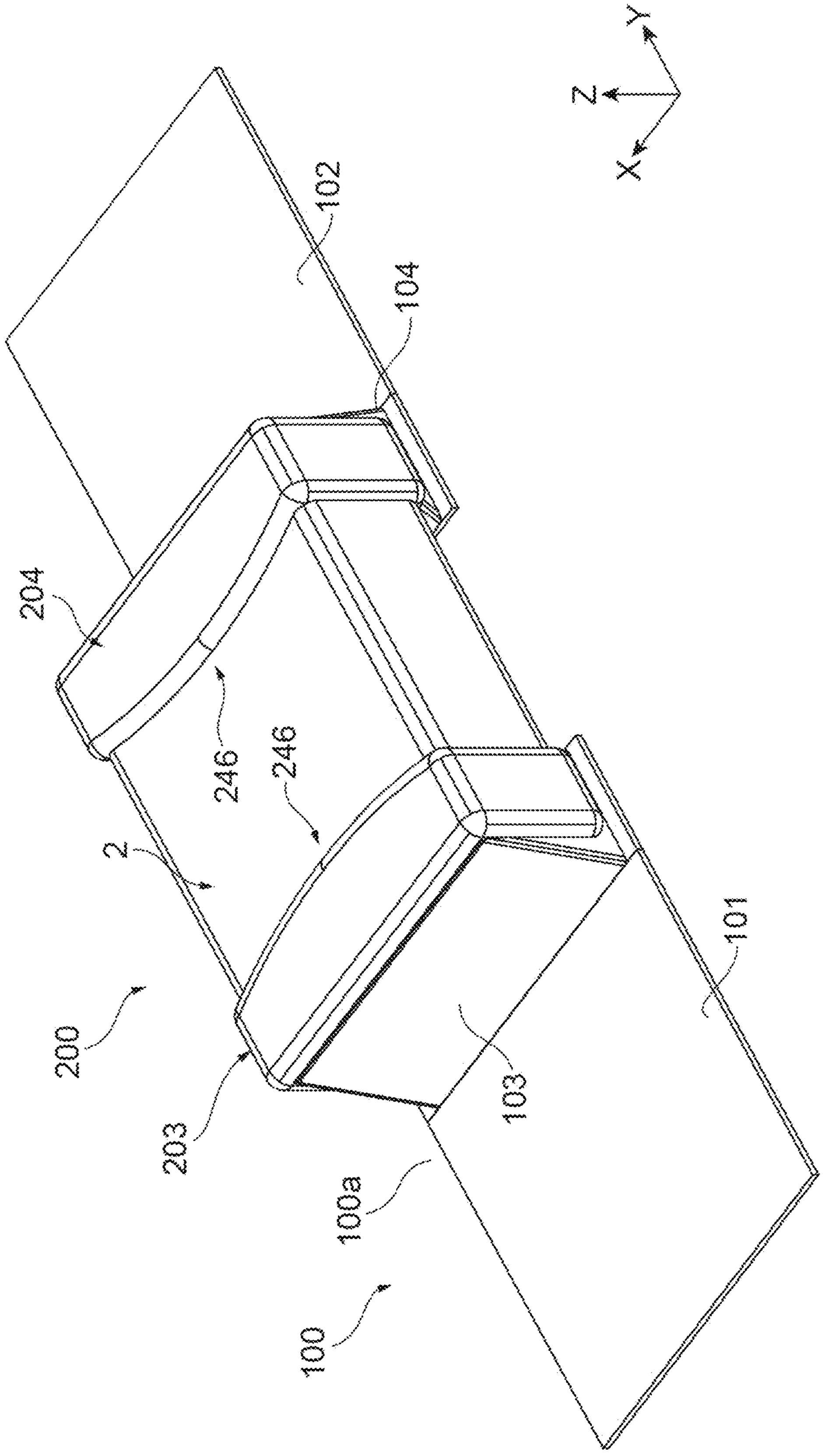
FIG. 7 is a perspective view of an electronic component according to Modification Example 2.

Next, with reference to FIGS. 6 to 10B, simulation results of Example and Comparative Examples 1 and 2 will be described. FIG. 6 is a perspective view illustrating an electronic component 150 according to Comparative Example 1. As illustrated in FIG. 6, in Comparative Example 1, wrapping-around portions of external electrodes 153 and 154 do not have a protruding portion and a recessed portion, and edge portions 153*a* and 154*a* linearly extend in the X axis direction. FIG. 7 is a perspective view illustrating an electronic component 200 according to Comparative Example 2. As illustrated in FIG. 7, in Comparative Example 2, the wrapping-around portions of the external electrodes 203 and 204 respectively have the protruding portions 246 at the center positions in the X axis direction.

Figure 8:
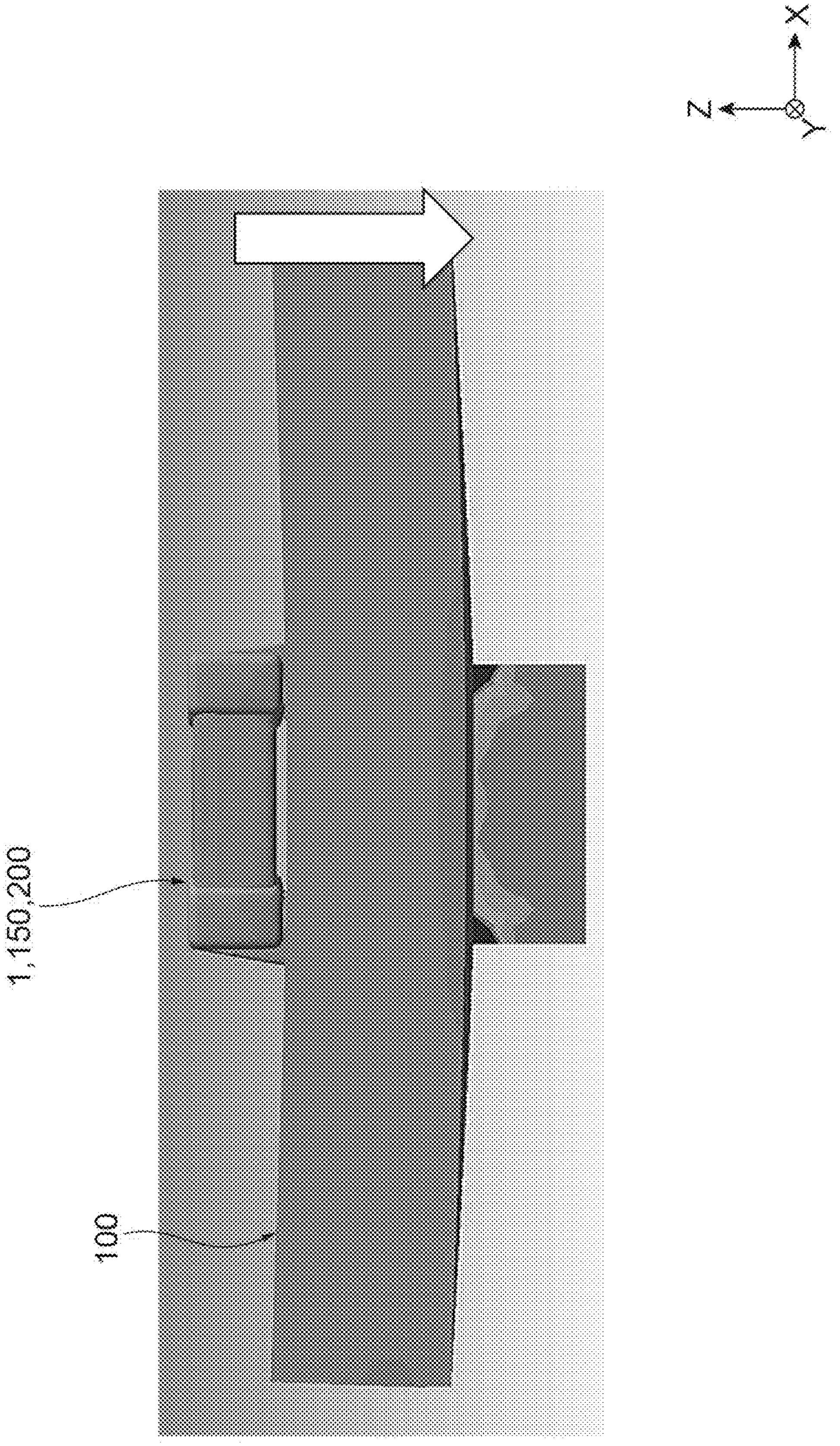
FIG. 8 is a view illustrating a way of bending a substrate for simulating stress acting on the electronic component.

As shown in FIG. 8, the substrates 100 having the electronic components 1, 150, and 200 according to Example and Comparative Examples 1 and 2 respectively mounted thereon were bent to the negative side in the Z axis direction, and stress acting on the electronic components 1, 150, and 200 at this time was measured through a simulation.

Figure 9C:
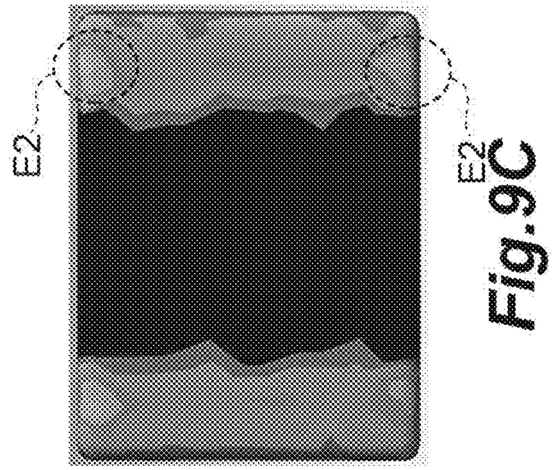
FIGS. 9A, 9B, 9D, 9C, 9D, 9E, and 9F are images showing simulation results.
Figure 9F:
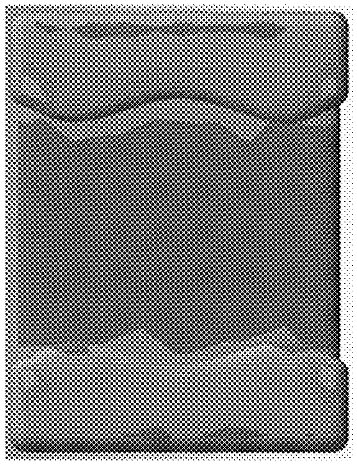
Figure 9B:
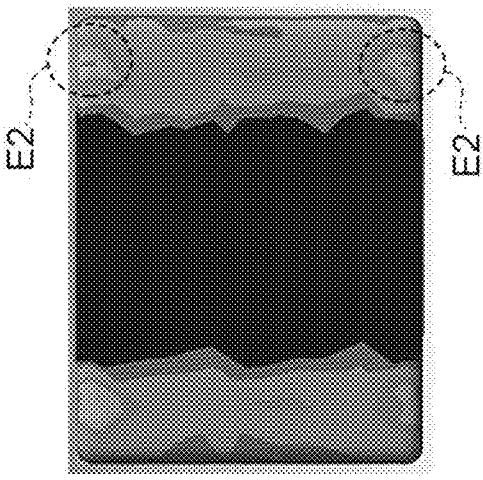
Figure 9E:
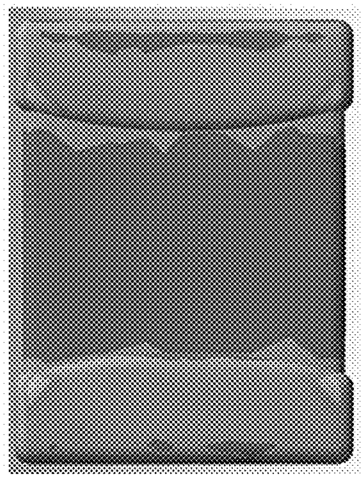
Figure 9A:
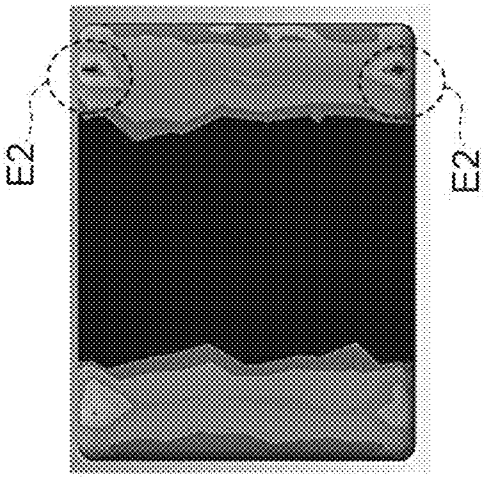
Figure 10A:
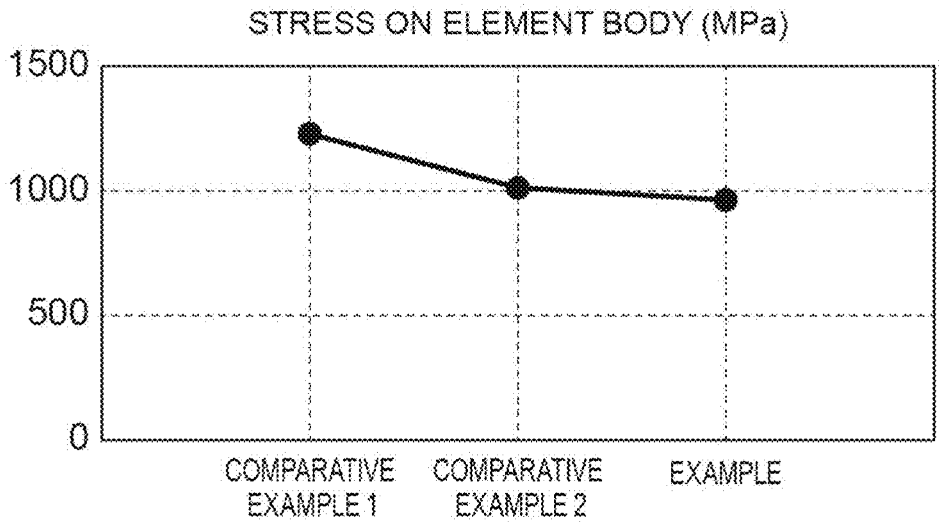
FIGS. 10A and 10B are graphs showing simulation results.

FIGS. 9A to 9C are images showing simulation results indicating stress acting on the element body 2. FIGS. 9A to 9C are images of the element body 2 viewed from a mounting surface side. FIG. 9A shows the result of Comparative Example 1, FIG. 9B shows the result of Comparative Example 2, and FIG. 9C shows the result of Example. As indicated in regions E2 of edge portions in the external electrode in FIGS. 9A to 9C, stress was the highest in Comparative Example 1, stress was the second highest in Comparative Example 2, and stress was the lowest in Example. As shown in FIG. 10A, stress in Comparative Example 2 was reduced by 18% with respect to that in Comparative Example 1, and stress in Example was reduced by 5% with respect to that in Comparative Example 2.

Figure 9D:
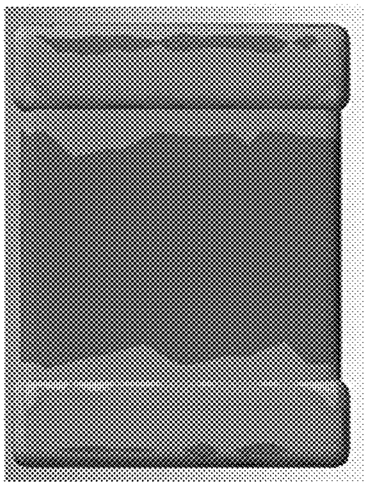
Figure 10B:
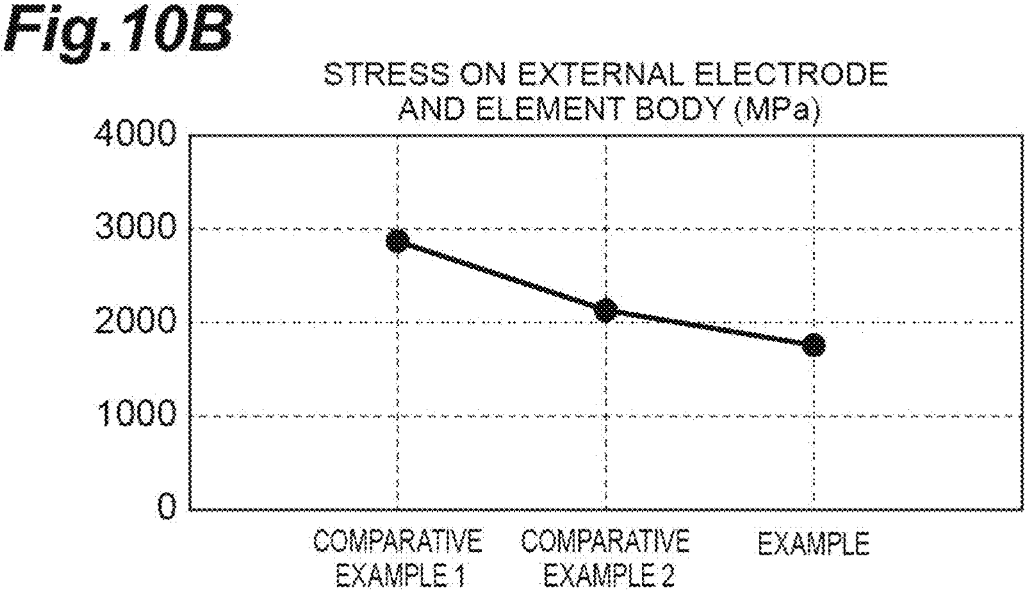

FIGS. 9D to 9F are images showing simulation results indicating stress acting on the element body 2 and the external electrode. FIGS. 9D to 9F are images of the element body 2 viewed from the mounting surface side. FIG. 9D shows the result of Comparative Example 1, FIG. 9E shows the result of Comparative Example 2, and FIG. 9F shows the result of Example. As shown in FIG. 10B, stress in Comparative Example 2 was reduced by 26% with respect to that in Comparative Example 1, and stress in Example was reduced by 18% with respect to that in Comparative Example 2.

The present disclosure is not limited to the embodiment described above.

The shape of the wrapping-around portion of the external electrode is not limited to that illustrated in FIGS. 3A and 3B. For example, the recessed portion 48 may not have a curved shape, and as illustrated in FIG. 5A, the recessed portion 48 may have a linear shape. In addition, the protruding portions 46 and 47 may also not have a curved shape, and a portion near the apex portion may have a linear shape.

The positions of the second part 42 and the fourth part 44 in the X axis direction are not particularly limited. For example, the second part 42 and the fourth part 44 may be disposed on the centerline CL1 side from the centerlines CL2 and CL3. In addition, both the second part 42 and the fourth part 44 may be disposed on one side in the X axis direction with respect to the centerline CL1.

In the embodiment described above, the coil portion has an annular shape when viewed from the Z axis, but the shape of the coil portion is not particularly limited. The coil portion may have a rectangular ring shape or a polygonal ring shape.

1. An electronic component comprising:
   an element body having a pair of first surfaces facing each other in a first direction, a pair of second surfaces facing each other in a second direction orthogonal to the first direction, and a pair of third surfaces facing each other in a third direction orthogonal to the first direction and the second direction; and
   an external electrode having a main body portion covering at least the second surface and a first wrapping-around portion wrapping around the third surface in the element body,
   wherein the wrapping-around portion of the external electrode has a first part having a first distance, a second part having a second distance, a third part having a third distance, a fourth part having a fourth distance, and a fifth part having a fifth distance in the second direction in order from one side to the other side in the first direction,
   wherein the second distance is longer than the first distance and the third distance, and
   wherein the fourth distance is longer than the third distance and the fifth distance.
2. The electronic component according to embodiment 1,
   wherein the second part and the fourth part are disposed with a center position of the element body in the first direction interposed therebetween.
3. The electronic component according to embodiment 1 or 2,
   wherein thicknesses of the second part and the fourth part in the third direction are larger than thicknesses of the first part, the third part, and the fifth part.
4. The electronic component according to any one of embodiments 1 to 3,
   wherein the second part and the fourth part are disposed at positions closer to the first surfaces than the center position of the element body in the first direction.
5. The electronic component according to any one of embodiments 1 to 4 further comprising:
   a coil provided inside the element body,
   wherein a coil portion of the coil does not overlap the second part and the fourth part when viewed in the third direction.
6. The electronic component according to any one of embodiments 1 to 5,
   wherein the external electrode has the pair of first wrapping-around portions wrapping around the pair of third surfaces, and a pair of second wrapping-around portions wrapping around the pair of first surfaces, and
   wherein in the pair of first wrapping-around portions, the second distance is longer than the first distance and the third distance, and the fourth distance is longer than the third distance and the fifth distance.

REFERENCE SIGNS LIST

1 Electronic component
2 Element body
2*e*, 2*f* Side surface (first surface)
2*a*, 2*b* End surface (second surface)
2*c*, 2*d* Side surface (third surface)
10 Coil
12 Coil portion
3, 4 External electrode
21, 31 Main body portion
22, 23, 32, 33 Wrapping-around portion (first wrapping-around portion)
24, 26, 34, 36 Wrapping-around portion (second wrapping-around portion)

41 First part
42 Second part
43 Third part
44 Fourth part
45 Fifth part

What is claimed is:

1. An electronic component comprising:

an element body having a pair of first surfaces facing each other in a first direction, a pair of second surfaces facing each other in a second direction orthogonal to the first direction, and a pair of third surfaces facing each other in a third direction orthogonal to the first direction and the second direction; and an external electrode having a main body portion covering at least one of the second surfaces and a first wrapping-around portion wrapping around one of the third surfaces in the element body, wherein the wrapping-around portion of the external electrode has a first part having a first distance, a second part having a second distance, a third part having a third distance, a fourth part having a fourth distance, and a fifth part having a fifth distance in the second direction in order from one side to the other side in the first direction, wherein the second distance is longer than the first distance the third distance, and wherein the fourth distance is longer than the third distance and the fifth distance, and wherein thicknesses of the second part and the fourth part in the third direction are larger than thicknesses of the first part, the third part, and the fifth part.

2. The electronic component according to claim 1, wherein the second part and the fourth part are disposed with a center position of the element body in the first direction interposed therebetween.

3. The electronic component according to claim 1, wherein the second part and the fourth part are disposed at positions closer to the first surfaces than the center position of the element body in the first direction.

4. The electronic component according to claim 1 further comprising:

a coil provided inside the element body, wherein a coil portion of the coil does not overlap the second part and the fourth part when viewed in the third direction.

5. The electronic component according to claim 1, wherein the external electrode has a pair of first wrapping-around portions wrapping around the pair of third surfaces, and a pair of second wrapping-around portions wrapping around the pair of first surfaces, and wherein in the pair of first wrapping-around portions, the second distance is longer than the first distance and the third distance, and the fourth distance is longer than the third distance and the fifth distance.

* * * * *